(12) United States Patent
Chen et al.

(10) Patent No.: US 8,728,366 B2
(45) Date of Patent: May 20, 2014

(54) METHOD AND DEVICE FOR MAKING AN OPTICAL PLATE FORMED WITH A MICROSTRUCTURE

(75) Inventors: Hsin-Hung Chen, Tainan (TW); Wei-Chan Tseng, Tainan (TW); Chung-Hao Wang, Tainan (TW); Chun-Liang Kuo, Tainan (TW)

(73) Assignee: Chi Mei Corporation, Tainan (TW)

( * ) Notice: Subject to any disclaimer, the term of this patent is extended or adjusted under 35 U.S.C. 154(b) by 287 days.

(21) Appl. No.: 13/209,049

(22) Filed: Aug. 12, 2011

(65) Prior Publication Data

US 2012/0043679 A1 Feb. 23, 2012

(30) Foreign Application Priority Data

Aug. 17, 2010 (TW) ................................ 99127425 A
Apr. 25, 2011 (TW) ................................ 100114277 A

(51) Int. Cl.
*B29D 11/00* (2006.01)
(52) U.S. Cl.
USPC ............ 264/136; 264/1.38; 264/1.6; 264/1.7; 264/495; 264/496; 425/133.5; 425/174.4; 425/328; 425/363
(58) Field of Classification Search
USPC ......... 264/1.34, 1.36, 1.38, 1.6, 1.7, 2.7, 166, 264/165, 495, 496; 425/174.4, 808, 810, 425/113, 133.5, 134, 328, 363
See application file for complete search history.

(56) References Cited

U.S. PATENT DOCUMENTS

2005/0127541 A1* 6/2005 Spurgeon et al. ............ 264/1.34
2007/0216050 A1* 9/2007 Kim et al. .................... 264/1.36

FOREIGN PATENT DOCUMENTS

JP 01-312749 * 12/1989
JP 2001-113538 A 4/2001

* cited by examiner

*Primary Examiner* — Mathieu D. Vargot
(74) *Attorney, Agent, or Firm* — Morrison & Foerster LLP

(57) ABSTRACT

A method for making an optical plate formed with a microstructure includes: extruding a substrate material and advancing the same to pass through a first nip formed between an embossing roller and a first pressing roller, the embossing roller having a micropatterned surface formed with a plurality of protrusions and a plurality of grooves, the protrusions and the grooves cooperatively defining a microstructure-forming space; applying a photosensitive resin to the micropatterned surface and filling the same into the microstructure-forming space upstream of the first nip to form a plurality of microelements respectively in the microstructure-forming space; allowing the photosensitive resin applied to the micropatterned surface to pass through the first nip together with the substrate material, thereby bonding the microelements to the substrate material; and irradiating and curing the photosensitive resin downstream of the first nip to form the optical plate.

17 Claims, 7 Drawing Sheets

METHOD AND DEVICE FOR MAKING AN OPTICAL PLATE FORMED WITH A MICROSTRUCTURE

CROSS-REFERENCE TO RELATED APPLICATION

This application claims priority of Taiwanese application No. 099127425, filed on Aug. 17, 2010, and Taiwanese application No. 100114277, filed on Apr. 25, 2011.

BACKGROUND OF THE INVENTION

1. Field of the Invention

This invention relates to a method and a device for making an optical plate formed with a microstructure.

2. Description of the Related Art

As shown in FIG. 1, Japanese Patent Publication No. 2001-113538 discloses a method for making an optical film formed with a microstructure. The method includes: (a) reeling out an substrate material 1; (b) applying an ultraviolet photosensitive resin 10 to a surface of the substrate material 1; (c) advancing the substrate material 1 and the ultraviolet photosensitive resin 10 applied onto the substrate material 1 through a pair of pressing rollers 11, one of which having a micropatterned surface, so as to form an optical film formed with a microstructure 13; and (d) irradiating and curing the ultraviolet photosensitive resin 10 of the optical film using an irradiation apparatus 12.

To be specific, when the substrate material 1 and the ultraviolet photosensitive resin 10 pass through the pressing rollers 11, the ultraviolet photosensitive resin 10 is subjected to a pressing force from the pressing rollers 11 and fills into grooves of the micropattern thereof, followed by curing of the ultraviolet photosensitive resin 10 using the irradiation apparatus 12 so as to form the microstructure 13 on the substrate material 1. In the Japanese publication, since the combined thickness of the substrate material 1 and the ultraviolet photosensitive resin 10 is relatively small, i.e., less than 0.3 mm, the substrate material 1 and the ultraviolet photosensitive resin 10 have good flexibility and can be flexed to contact intimately the pressing rollers 11.

However, as for an optical plate which is generally used in a backlight module of a liquid crystal display and which has a relatively larger thickness than that of the optical film of the above Japanese Patent Publication and thus has a relatively inferior flexibility, such as a light diffusion plate or a light guide plate, the substrate material 1 applied with the ultraviolet photosensitive resin 10 might not be able to contact intimately the surfaces of the pressing rollers 11. Moreover, since the substrate material 1 may not be in intimate contact with the pressing rollers 11, the ultraviolet photosensitive resin 10 applied thereon might not be completely pressed by the micropatterned surface of the rollers 11. Therefore, transfer of the micropattern of the pressing rollers 11 to the microstructure of the optical plate is likely to be incomplete, i.e., defective microstructure, and thus has a poor transferring rate.

SUMMARY OF THE INVENTION

Therefore, the object of the present invention is to provide a method and a device for making an optical plate formed with a microstructure thereon.

According to one aspect of the present invention, a method for making an optical plate formed with a microstructure comprises: extruding a substrate material and advancing the same to pass through a first nip formed between an embossing roller and a first pressing roller at a temperature ranging from a glass transition temperature ($T_g$) of the substrate material to $T_g+100°$ C., the embossing roller having a micropatterned surface formed with a plurality of protrusions and a plurality of grooves, the protrusions and the grooves cooperatively defining a microstructure-forming space; applying a photosensitive resin to the micropatterned surface and filling the same into the microstructure-forming space upstream of the first nip to form a plurality of microelements respectively in the microstructure-forming space; allowing the photosensitive resin applied to the micropatterned surface to pass through the first nip together with the substrate material, thereby bonding the microelements to the substrate material; and irradiating and curing the photosensitive resin downstream of the first nip to form the optical plate.

According to another aspect of the present invention, a device for making an optical plate formed with a microstructure comprises: a roller unit including an embossing roller that has a micropatterned surface, and first and second pressing rollers each of which has a smooth surface, the embossing roller cooperating with the first pressing roller to define a first nip therebetween and with the second pressing roller to define a second nip therebetween, the second nip being disposed downstream of the first nip; an extruder for extruding a substrate material to the first nip; a resin-applying unit disposed immediately above the embossing roller for directing a photosensitive resin on the micropatterned surface of the embossing roller; and an irradiation unit disposed below the embossing roller and disposed downstream of the first nip and upstream of the second nip.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
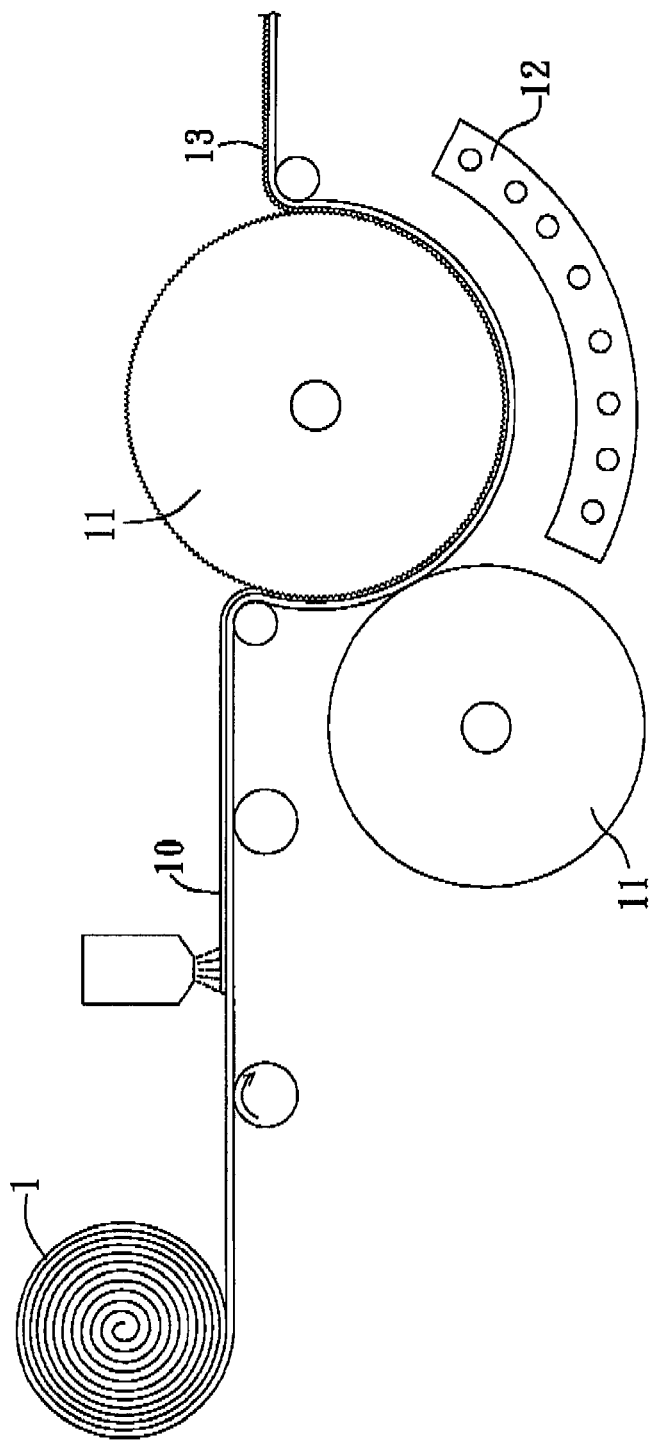
FIG. 1 is a schematic diagram to illustrate a conventional method for making an optical film.

Before the present invention is described in greater detail with reference to the accompanying preferred embodiments, it should be noted herein that like elements are denoted by the same reference numerals throughout the disclosure.

Figure 2:
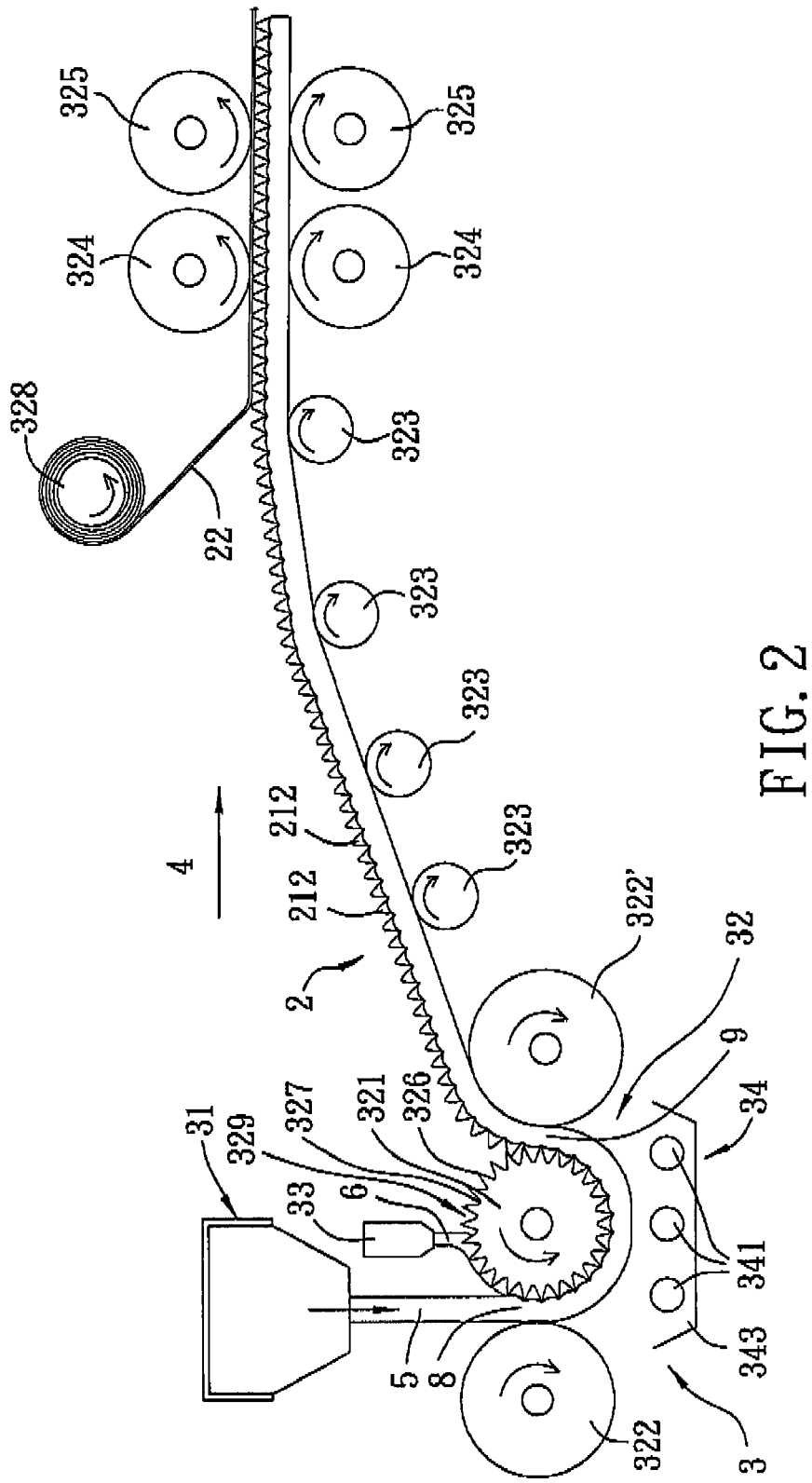
FIG. 2 is a schematic diagram to illustrate the first preferred embodiment of a method and a device for making an optical plate formed with a microstructure according to this invention.

FIG. 2 illustrates the first preferred embodiment of a method and a device 3 for making an optical plate 2 formed with a microstructure according to the present invention.

The device 3 includes an extruder 31 for extruding a substrate material 5, a resin-applying unit 33 for applying the photosensitive resin 6, a roller unit 32 disposed downstream of the extruder 31 and the resin-applying unit 33, and an irradiation unit 34. The optical plate 2 is formed from the substrate material 5 and the photosensitive resin 6. The roller unit 32 is used for forming the microstructure of the optical plate 2 and for conveying the optical plate 2 along a processing line 4.

The roller unit 32 includes an embossing roller 321 having a micropatterned surface, first and second pressing rollers 322, 322' each of which has a smooth surface, a plurality of conveying rollers 323 disposed downstream of the pressing rollers 322, 322' for conveying the optical plate 2, a pair of laminating rollers 324 disposed downstream of the conveying rollers 323 for laminating a protective film 22 and the optical plate 2, an applicator roller 328 disposed upstream of the laminating rollers 324 for applying the protective film 22 onto the optical plate 2, and a pair of drawing rollers 325 disposed downstream of the laminating rollers 324. The rollers of the roller unit 32 may be made from any material known to one skilled in the art, for example, metal, resin, rubber, etc. It should be noted that the numbers of the conveying rollers 323, the laminating rollers 324, and the drawing rollers 325 are not limited and may be adjusted according to practical requirements. In the examples of this invention, the embossing roller 321 and the first and second pressing rollers 322, 322' are respectively at a temperature of 70° C., 80° C., and 60° C.

In particular, the micropatterned surface of the embossing roller 321 is formed with a plurality of protrusions 326 and a plurality of grooves 327. The protrusions 326 and the grooves 327 cooperatively define a microstructure-forming space 329. Optionally, the micropattern may have a prism shape, a lenticular shape, etc. In this embodiment, the protrusions 326 and the grooves 327 are axially extended. However, the extending direction of the protrusions 326 and the grooves 327 should not be limited in the axial direction. The embossing roller 321 cooperates with the first pressing roller 322 to defines first nip 8 therebetween and with the second pressing roller 322' to define a second nip 9 therebetween. The second nip 9 is disposed downstream of the first nip 8 along the processing line 4.

The extruder 31 extrudes the substrate material 5 to the first nip 8. The resin-applying unit 33 is disposed immediately above the embossing roller 321 and is used for directing the photosensitive resin 6 onto the micropatterned surface of the embossing roller 321 upstream of the first nip 8. The irradiation unit 34 includes a plurality of irradiators 341 and is used to cure the photosensitive resin 6 applied onto the substrate material 5. Preferably, the irradiation unit 34 is disposed below the embossing roller 321 and disposed downstream of the first nip 8 and upstream of the second nip 9. Preferably, the irradiation unit 34 has an optical power ranging from 100 W/cm to 1,000 W/cm.

The method for making the optical plate 2 formed with a microstructure using the aforesaid device 3 of the present invention includes: extruding a substrate material 5 from the extruder 31 and advancing the same to pass through the first nip 8 at a temperature ranging from the glass transition temperature ($T_g$) of the substrate material 5 to $T_g+100°$ C.; applying a photosensitive resin 6 to the micropatterned surface of the embossing roller 321 and filling the same into the microstructure-forming space 329 upstream of the first nip 8 to form a plurality of microelements 212 respectively in the microstructure-forming space 329; allowing the photosensitive resin 6 applied to the micropatterned surface of the embossing roller 321 to pass through the first nip 8 together with the substrate material 5, thereby bonding the microelements 212 to the substrate material 5; and irradiating and curing the photosensitive resin 6 downstream of the first nip 8 using the irradiation unit 34.

Preferably, the method further includes a step of passing the substrate material 5 and the photosensitive resin 6 through the second nip 9, which is formed between the embossing roller 321 and the second pressing roller 322' and disposed downstream of the first nip 8, such that the photosensitive resin 6 contacts against the micropatterned surface of the embossing roller 321 between the first and second nips 8, 9. The photosensitive resin 6 is irradiated by the irradiation unit 34 between the first and second nips 8, 9.

In the steps of extruding and advancing the substrate material 5, the extruded substrate material 5 is preferably at a molten state and in a plate form. After being extruded from the extruder 31, the molten substrate material 5 passes through a cooling area located between the extruder 31 and the first nip 8 such that the molten substrate material 5 is properly cooled to be in a desired temperature range when passing through the first nip 8 (see infra). Cooling of the substrate material 5 can be conducted using air, cooling air, etc.

At the point where the substrate material 5 passes through the first nip 8, i.e., the substrate material 5 initially comes into contact with the embossing roller 321, the temperature of the extruded substrate material 5 preferably ranges from $T_g$ ° C. to $T_g+80°$ C., more preferably, from $T_g$ ° C. to $T_g+60°$ C., and most preferably, from $T_g$ ° C. to $T_g+40°$ C. In the aforesaid temperature range, the substrate material 5 is in a semi-solid state, and can be in intimate contact with the micropatterned surface of the embossing roller 321. The temperature of the substrate material 5 herein is an average temperature of the plate of the substrate material 5 at three locations, i.e., a location on the center of the plate of the substrate material 5 and two locations on the plate a quarter of the width from each of two edges of the plate. The temperature may be measured using apparatuses such as infrared thermometer, optical thermometer, radiation thermometer, colorimetric thermometer, etc.

When the temperature of the substrate material 5 is too high, the fluidity of the substrate material 5 is excessively high that causes the same to be in the molten state for a longer duration and to have lower formability. When the temperature is below $T_g$ ° C., the substrate material 5 becomes solid and cannot intimately contact the micropatterned surface of the embossing roller 321, thereby resulting in a poor transferring rate and poor formability.

Preferably, in order to maintain the substrate material 5 at a temperature ranging from $T_g$ ° C. to $T_g+100°$ C., the temperatures of the embossing roller 321 and the first and second pressing rollers 322, 322' are respectively controlled to be in ranges from 30° C. to 100° C., 70° C. to 120° C., and 50° C. to 100° C.

Preferably, the substrate material 5 is an optical resin material that has specific optical properties and is suitable for making an optical plate. Examples of the substrate material 5 include, but are not limited to, Acrylic resin (e.g. PMMA resin), Polycarbonate resin (PC resin), Polystyrene resin (PS resin), Methyl methacrylate-styrene copolymer (MS resin), Acrylonitrile-styrene copolymer (AS resin), Cyclic olefin polymers (COC resin), and Polyethylene terephthalate (PETG resin). The aforesaid Arylic resin is formed from Acrylate monomers such as methyl methacrylate, ethyl methacrylate, methyl isopropyl methacrylate, n-butyl acrylate, methacrylate, ethyl acrylate, isopropyl acrylate, etc. Preferably, the Acrylic resin is formed from methyl methacrylate and methacrylate.

Additionally, the substrate material 5 may include an additive such as a light diffusion agent, an ultraviolet-radiation absorber and an antioxidant. The light diffusion agent may be inorganic microparticles made from, e.g., barium sulfate ($BaSO_4$) or titanium dioxide ($TiO_2$), or organic microparticles made from, e.g., Polystyrene resin, Acrylic resin, Methacrylic resin, or Polyorganosiloxane resin.

The plate of the substrate material 5 has a thickness defined by the first nip 8, a length along the processing line 4, and a width transverse to the length. For achieving a desired thickness of the final product, i.e., the optical plate 2, the extrusion rate for the extruder 31, the rotation rates for the embossing roller 321 and the first and second pressing rollers 322, 322', and the width of the first and second nips 8, 9 may be adjusted based on practical requirements. Preferably, the thickness of the optical plate 2 ranges from 0.1 to 10 mm, more preferably from 0.3 to 8 mm, and most preferably from 0.4 to 6 mm.

The step of applying the photosensitive resin 6 is conducted using the resin-applying unit 33 through spray coating, extruding, or any method known to one skilled in the art. The application rate may be properly adjusted so as to thoroughly fill the photosensitive resin 6 into the microstructure-forming space 329 of the embossing roller 321 upstream of the first nip 8 to form a plurality of microelements 212. If the application rate is either too high or too low, the photosensitive resin 6 may not fill into the microstructure-forming space 329 properly and may fail to form the desired microelements 212. Preferably, the application rate ranges from 50 $cm^3$/min·m to 1, 200 $cm^3$/min·m. The unit ($cm^3$/min·m) is the applied amount per unit of time and per unit of plate width, in which plate width indicates the width of the applied photosensitive resin 6.

Figure 3:
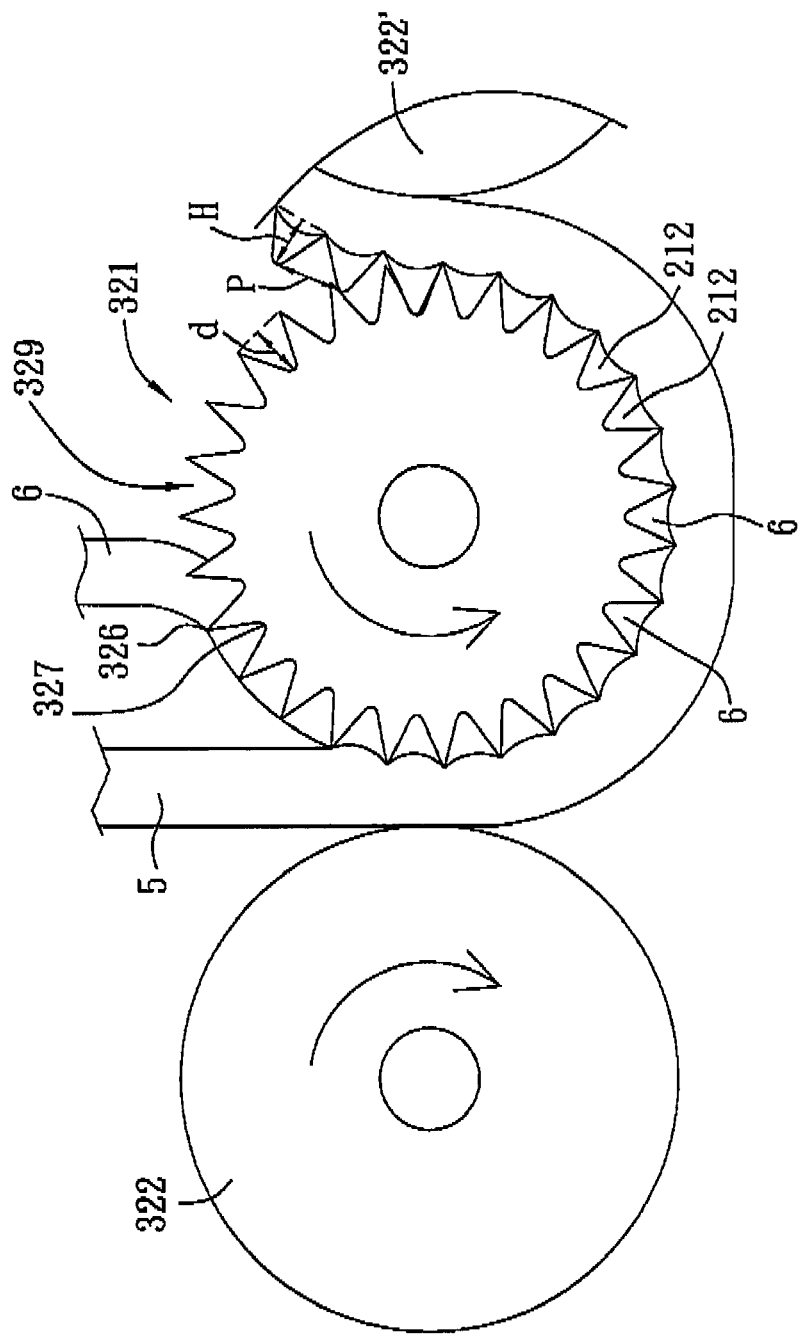
FIG. 3 is a fragmentary enlarged schematic diagram of FIG. 2.

Referring to FIG. 3, it should be noted that, when the photosensitive resin 6 and the substrate material 5 pass through the first nip 8, the same are forced by the embossing roller 321 and the first pressing roller 322 such that the substrate material 5 is likely to slightly protrude into the microstructure-forming space 329 and thus to force the photosensitive resin 6 filled in the microstructure-forming space 329, thereby further facilitating formation of a complete shape of the micropattern for the microelements 212.

The photosensitive resin 6 has the properties of high fluidity and high photosensitivity, i.e., it is able to be cured by radiation of light through induced cross-linking reaction. For example, the photosensitive resin 6 may be an ultraviolet (UV) photosensitive resin, an infrared (IR) photosensitive resin, or a halogen photosensitive resin. In the preferred embodiment of this invention, the photosensitive resin 6 is an ultraviolet photosensitive resin that includes, e.g., an Acrylic resin present in a range from 40 wt % to 50 wt % based on 100 wt % ultraviolet photosensitive resin, a free radical photo-initiator present in a range from 5 wt % to 15 wt % based on 100 wt % ultraviolet photosensitive resin, and a reactive Acrylic cross-linking resin present in a range from 40 wt % to 50 wt % based on 100 wt % ultraviolet photosensitive resin. Examples of the free radical photo-initiator include trimethyl benzoyl phosphine oxide (TPO), 2-methyl-1-[4-(methylthio) phenyl]-2-morpholino propan-1-one (e.g., Ciba Irgacure 907), isothioxanthone (ITX) and combinations thereof. Examples of the reactive Acrylic cross-linking resin include di-trimethylolpropane tetraacrylate (e.g., SR-355), dipentaerythritol monohydroxy pentaacrylate (e.g., SR-399), ethoxylated bisphenol A diacrylate (e.g., SR-349), and combinations thereof.

Generally, when the optical plate 2 is used for condensing light, the difference in refractive index between the photosensitive resin 6 and the substrate material 5 is preferably not larger than 0.05. More preferably, the difference is not larger than 0.03, and most preferably, not larger than 0.01. However, when the optical plate 2 is used for light diffusion, a larger difference of the refractive index is allowable.

The irradiation unit 34 used for irradiating and curing the photosensitive resin 6 between the first and second nips 8, 9 may be an ultraviolet (UV) light irradiator, an infrared (IR) light irradiator, or a halogen light irradiator. The wavelength of the light of the irradiation unit 34 is decided based on the material of the photosensitive resin 6. For example, in the preferred embodiment of the present invention, an ultraviolet light irradiator is used for irradiating the ultraviolet photosensitive resin.

Preferably, the irradiation unit 34 further includes a reflecting cover plate 343 disposed in the back of the irradiators 391 to improve the uniformity and efficiency of the irradiators 341. Preferably, the reflecting cover plate 343 is in the form of an arc.

Preferably, the method for making an optical plate 2 formed with a microstructure according to the present invention further includes, after curing the photosensitive resin 6, a step of coating a protective film 22 on the optical plate 2 so as to protect the surface thereof from damage. The protective film 22 is applied by the applicator roller 328 and is bonded to the optical plate 2 when passed the laminating rollers 324. The protective film 22 may be made from, for example, Polyetheylne (PE), Polyethylene terephthalate (PET), etc.

A transferring rate is used here to determine the efficiency of the method according to the present invention. The transferring rate is defined as the ratio of the height (H) of the microelement 212 to the depth (d) of the grooves 327 formed on the micropatterned surface of the second roller 321 (see FIG. 3), and is measured using an optical microscope. The method of the present invention has a transferring rate higher than 95%, preferably, higher than 97%, and most preferably, higher than 99%. In examples of this invention, the height (H) of each of the microelements 212 ranges from 280 to 330 μm, and the depth (d) of each of the grooves 327 ranges from 290 to 340 μm.

Figure 4:
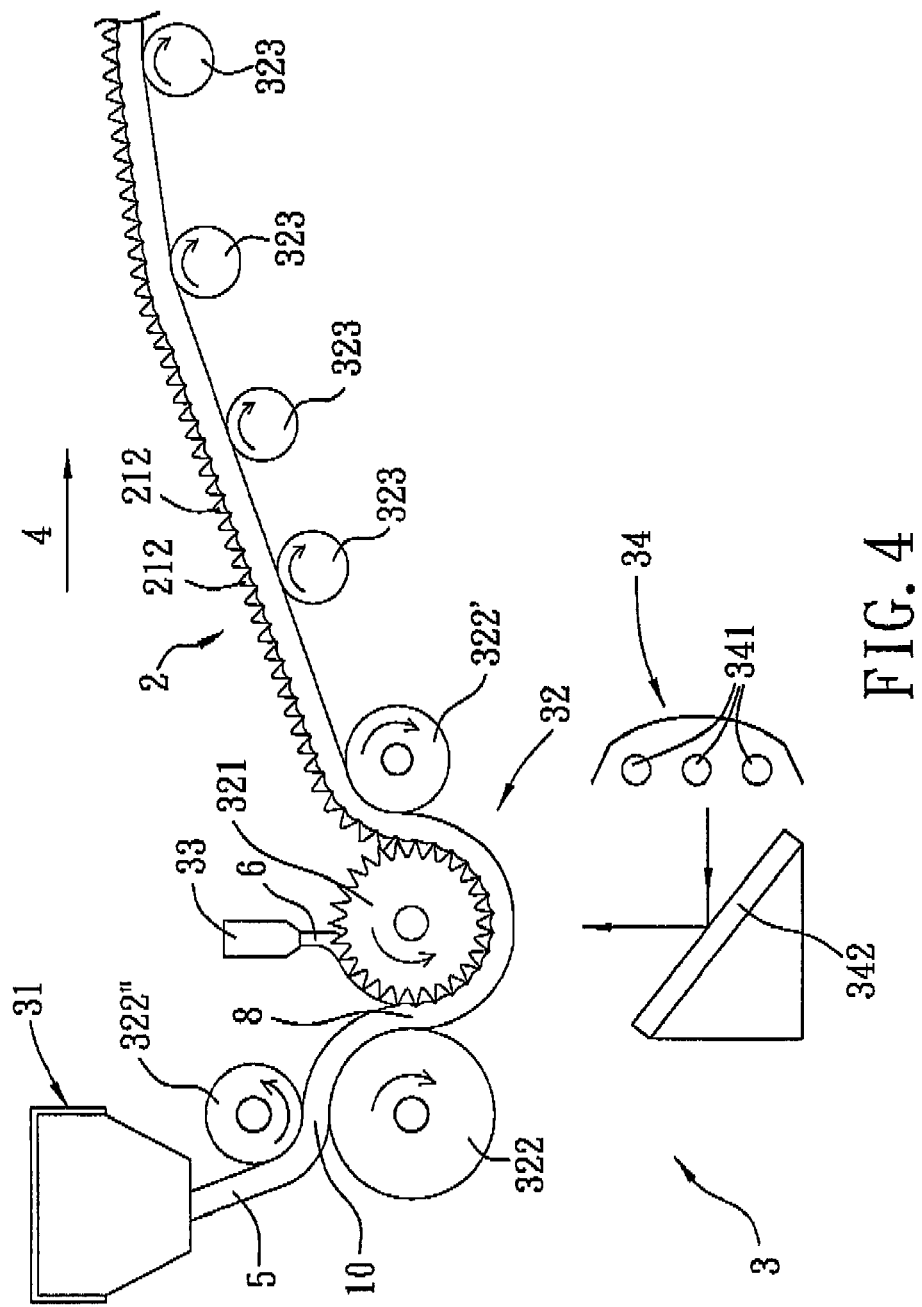
FIG. 4 is a schematic diagram to illustrate the second preferred embodiment of a method and a device for making an optical plate formed with a microstructure according to this invention.

Referring to FIG. 4, the second preferred embodiment of the device 3 for making the optical plate 2 differs from the first preferred embodiment in that the roller unit 32 further includes a third pressing roller 322", and the irradiation unit 34 further includes a reflector 342.

The third pressing roller 322" has a smooth surface similar to the first and second pressing rollers 322, 322', and cooperates with the first pressing roller 322 to define a third nip 10 therebetween. The third nip 10 is disposed downstream of the extruder 31 and upstream of the first nip 8 such that the substrate material 5 extruded from the extruder 31 is advanced to pass through the third nip 10 before the first nip 8. Since both of the first and third pressing rollers 322, 322" have smooth surfaces, the same can flatten the surface of the plate of the substrate material 5, thereby improving the bonding of the microelements 212 on the plate of the substrate material 5 in the following process. Preferably, the third pressing roller is at a temperature of 80° C.

The reflector 342 of the irradiation unit 34 is used for reflecting the light emitted from the irradiators 341 to the embossing roller 321 so as to cure the microelements 212 of the photosensitive resin 6 on the plate of the substrate material 5. In this embodiment, the reflector 342 is disposed below the embossing roller 321, and the irradiators 341 are not disposed below the embossing roller 321. The arrangement can prevent the irradiators 341 from being contaminated by the photosensitive resin 6 that drips from the embossing roller 321, thereby assuring the clearness and the light emission efficiency of the irradiator 341 and reducing maintenance costs for the irradiation unit 34.

Figure 5:
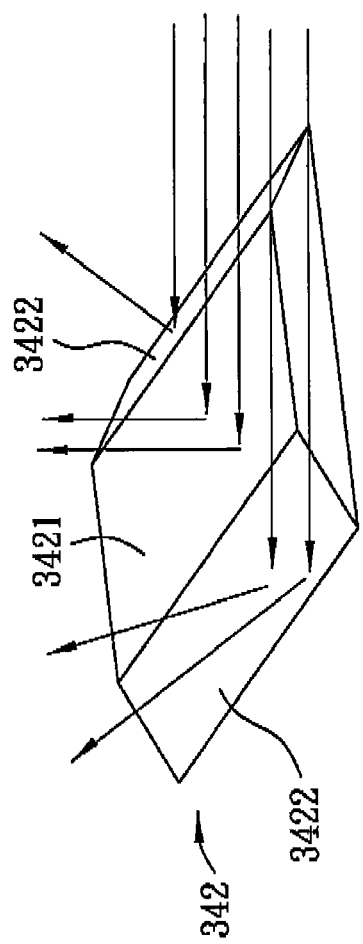
FIG. 5 is an enlarged schematic diagram showing a reflector of an irradiation unit of the device shown in FIG. 4.

Referring to FIG. 5, an exemplary reflector 342 of the irradiation unit 34 includes a middle reflecting surface 3421 facing and inclined to the irradiator 341 not shown), two side reflecting surfaces 3422 respectively connected to two opposite edges of the middle reflecting surface 3421 and inclined at an angle of about 30 degrees with respect to the middle reflecting surface 3421. In this embodiment, the middle surface 3921 is inclined at an angle such that the same may directly reflect the light from the irradiator 341 to the embossing roller 321. At the same time, the side reflecting surfaces 3422 may reflect the light to different directions so as to broaden the irradiation range of the light, thereby improving the irradiation efficiency of the irradiation unit 34. Alternatively, the reflector 342 may be in the form of a pyramid, a column, etc.

Figure 6:
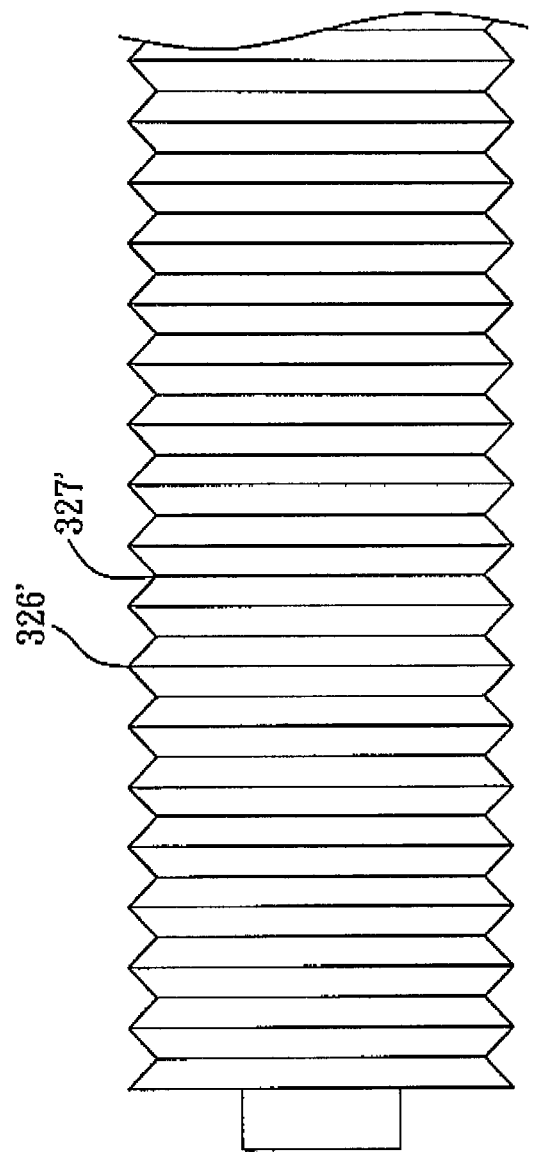
FIG. 6 is a fragmentary perspective diagram illustrating an embossing roller of the third preferred embodiment of a device for making an optical plate according to this invention.
Figure 7:
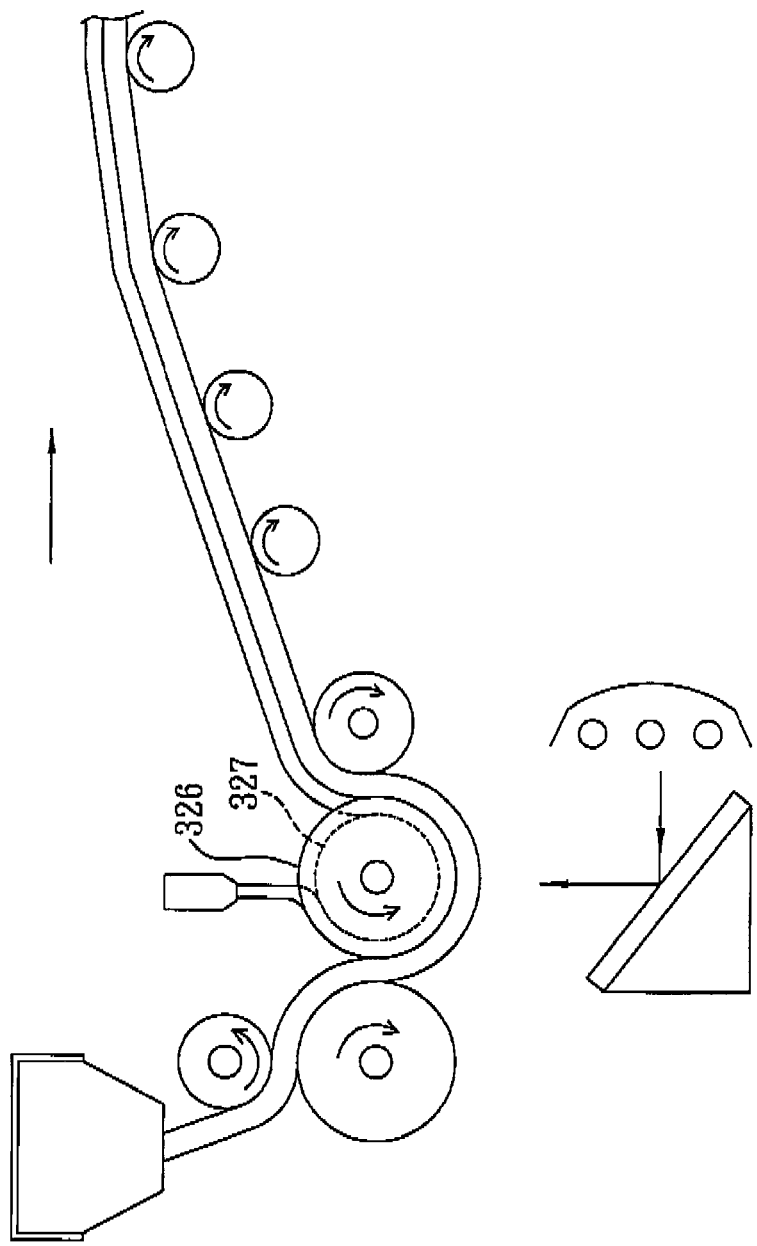
FIG. 7 is a schematic diagram to illustrate the third preferred embodiment of the device including the embossing roller shown in FIG. 6.

FIG. 6 illustrates an embossing roller used in the third preferred embodiment of a device for making an optical plate according to this invention. The embossing roller in the third embodiment includes a plurality of annularly extending protrusions 326' and a plurality of annularly extending grooves 327'. Except for the extending direction of the protrusions 326' and the grooves 327', in the third embodiment, the device for making the optical plate has a structure similar to that of the second preferred embodiment (see FIG. 7).

EXAMPLE

A styrene resin 5 having a glass transition temperature ($T_g$) of about 105° C. was extruded by an extruder 31. The extruded styrene resin had a temperature of about 240° C., i.e., in a molten state, and was in a plate form. The extrusion rate was about 700 kg/hr.

After extrusion, the styrene resin 5 passed through the space between the extruder 31 and the first nip 8 formed between the embossing roller 321 and the first pressing roller 322 and was cooled in air. The distance between the extruder 31 and the first nip 8 was about 12 cm. When the styrene resin 5 was advanced to the first nip 8 and came into contact with the embossing roller 321 and the first pressing roller 322, the average temperature thereof was measured using an infrared thermometer and was about 120° C.

The embossing roller 321 formed with a micropatterned surface rotated counterclockwise at a rotation rate of 4 m/min, and was at a temperature of 70° C. The first pressing roller 322 rotated clockwise and was at a temperature of 80° C.

An ultraviolet light photosensitive resin 6 having a relatively high fluidity was applied to the micropatterned surface of the embossing roller 321 by spray coating at a rate of 600 cm³/min·m, and was filled into the microstructure-forming space 329 of the micropatterned surface upstream of the first nip 8 so as to form a plurality of microelements 212 in the microstructure-forming space 329. After passing though the first nip 8, the styrene resin 5 was bonded with the microelements 212 of the ultraviolet light photosensitive resin 6. The microelements 212 were irradiated and cured by an ultraviolet irradiator 34 disposed downstream of the first nip 8, thereby forming an optical plate 2. The ultraviolet irradiator 34 had an optical power of 240 W/cm.

Subsequently, the optical plate 2 passed through the second nip 9 that is formed between the embossing roller 321 and the second pressing roller 322' and that is disposed downstream of the ultraviolet irradiator 34. The second pressing roller 322' was at a temperature of 60° C. In this example, the height (H) and pitch (P) of each of the microelements were 300 μm and 350 μm respectively, and the depth (d) of each of the grooves 327 was 310 μm (see FIG. 3). Thus, the transferring rate in this example is about 96.8%.

The optical plate 2 was conveyed by the conveying rollers 323 at room temperature along the processing line 4 such that the optical plate 2 was cooled gradually. In particular, the thickness of the optical plate was about 0.7 mm.

A protective film 22 made from Polyethylene may be optionally laminated on the optical plate 2 by a pair of laminating rollers 324 disposed downstream of the conveying rollers 323 so as to protect the surface of the optical plate 2. Subsequently, the optical plate 2 may be conveyed by a pair of drawing rollers 325 along the processing line 4 for further processing.

According to the method of the present invention, the substrate material 5 is maintained at a temperature higher than $T_g$° C., so that, during advancing between the first and second nips 8, 9, the semi-solid substrate material 5 can be in intimate contact with the embossing roller 321 and the first pressing roller 322. During contacting with the embossing roller 321 and the first and second pressing rollers 322, 322', which have lower temperatures than that of the substrate material 5, the temperature of the substrate material 5 can be gradually reduced and thus the substrate material 5 can be gradually solidified.

Moreover, by filling the photosensitive resin 6 having high fluidity and photocurability into the microstructure-forming space 329 of the micropatterned surface of the embossing roller 321, and irradiating the same, a plurality of microelements 212 having a complete shape of the micropattern may be formed and bonded to the substrate material 5 so as to form the optical plate 2. By controlling the temperature of the substrate material 5 and the curing of the photosensitive resin 6, a method for making the optical plate 2 with a superior transferring rate can be obtained.

Furthermore, by the arrangement of the reflector 342 and the irradiators 341 of the irradiation unit 39, maintenance costs for the device 3 could be reduced. With the third pressing roller 322", the bonding of the microelements 212 to the plate of the substrate material is improved.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

What is claimed is:

1. A method for making an optical plate formed with a microstructure, comprising:
   extruding a substrate material and advancing the same to pass through a first nip formed between an embossing roller and a first pressing roller at a temperature ranging from a glass transition temperature (Tg) of the substrate material to Tg+100° C., the embossing roller having a micropatterned surface formed with a plurality of protrusions and a plurality of grooves, the protrusions and the grooves cooperatively defining a microstructure-forming space;
   applying a photosensitive resin to the micropatterned surface and filling the same into the microstructure-forming space upstream of the first nip to form a plurality of microelements respectively in the microstructure-forming space;
   allowing the photosensitive resin applied to the micropatterned surface to pass through the first nip together with the substrate material, such that the substrate material is in contact with the embossing roller and slightly protrudes into the microstructure-forming space, thereby bonding the microelements to the substrate material; and irradiating and curing the photosensitive resin downstream of the first nip to form the optical plate.

2. The method of claim 1, wherein the substrate material passes through the first nip at a temperature ranging from Tg° C. to Tg+80° C., and the temperature of the embossing roller is in the range from 30° C. to 100° C.

3. The method of claim 2, wherein the substrate material passes through the first nip at a temperature ranging from Tg° C. to Tg+60° C., and the temperature of the first roller is in the range from 70° C. to 120° C.

4. The method of claim 3, wherein the substrate material passes through the first nip at a temperature ranging from Tg° C. to Tg+40° C.

5. The method of claim 1, wherein the photosensitive resin is ultraviolet (UV) photosensitive resin, infrared (IR) photosensitive resin, or halogen photosensitive resin.

6. The method of claim 1, wherein the step of applying the photosensitive resin is conducted by spray coating, and the rate of spray coating ranges from 50 $cm^3/min \cdot m$ to 1200 $cm^3/min \cdot m$.

7. The method of claim 1, further comprising a step of laminating a protective film on the optical plate.

8. The method of claim 1, further comprising a step of passing the substrate material and the photosensitive resin through a second nip formed between the embossing roller and a second pressing roller downstream of the first nip such that the photosensitive resin contacts against the micropatterned surface between the first and second nips, wherein the photosensitive resin is irradiated between the first and second nips.

9. The method of claim 1, further comprising a step of flattening the surface of the extruded substrate material before advancing the same to pass through the first nip.

10. The method of claim 1, wherein the step of irradiating and curing the photosensitive resin is carried out using an irradiation unit, the irradiation unit including an irradiator for emitting light and a reflector for reflecting the light from the irradiator to the photosensitive resin.

11. The method of claim 1, wherein the optical plate has a thickness ranging from 0.1 mm to 10 mm.

12. The method of claim 11, wherein the optical plate has a thickness ranging from 0.3 mm to 8 mm.

13. The method of claim 11, wherein the optical plate has a thickness ranging from 0.4 mm to 6 mm.

14. A device for making an optical plate formed with a microstructure, comprising:

a roller unit including an embossing roller that has a micro-patterned surface formed with a plurality of grooves defining a microstructure-forming space, and first and second pressing rollers each of which has a smooth surface, said embossing roller cooperating with said first pressing roller to define a first nip therebetween and with said second pressing roller to define a second nip therebetween, said second nip being disposed downstream of said first nip;

an extruder for extruding a substrate material to said first nip;

a resin-applying unit disposed immediately above said embossing roller for directing a photosensitive resin onto said micropatterned surface of said embossing roller, said first nip being defined to allow the substrate material together with the photosensitive resin to pass therethrough, such that the substrate material is in contact with said embossing roller and slightly protrudes into said microstructure-forming space; and an irradiation unit disposed below said embossing roller and disposed downstream of said first nip and upstream of said second nip.

15. The device of claim 14, wherein said roller unit further includes a third pressing roller cooperating with said first pressing roller to define a third nip therebetween, said third nip being disposed downstream of said extruder and upstream of said first nip.

16. The device of claim 14, wherein said roller unit further includes a conveying roller disposed downstream of said second pressing roller for conveying the optical plate, a pair of laminating rollers disposed downstream of said conveying roller for laminating a protective film and the optical plate, an applicator roller disposed upstream of said laminating rollers for applying the protective film onto the optical plate, and a drawing roller disposed downstream of said laminating rollers.

17. The device of claim 14, wherein said irradiation unit includes an irradiator for emitting light and a reflector for reflecting the light from said irradiator to said embossing roller, said reflector being disposed below the embossing roller and said irradiator being not disposed below the embossing roller.

* * * * *